United States Patent
Spalthoff

[11] Patent Number: 6,062,098
[45] Date of Patent: May 16, 2000

[54] MOUNTING ARRANGEMENT FOR AN EXTERNAL GEARSHIFT MECHANISM OF AN AUTOMOBILE TRANSMISSION

[75] Inventor: Eberhard Spalthoff, Bielefeld, Germany

[73] Assignee: Ina Walzlager Schaeffler oHG, Germany

[21] Appl. No.: 09/130,275

[22] Filed: Aug. 6, 1998

[30] Foreign Application Priority Data

Aug. 20, 1997 [DE] Germany .......................... 197 36 106

[51] Int. Cl.[7] ............................ B60K 20/00; F16C 11/00; F16C 23/04

[52] U.S. Cl. ...................... 74/473.34; 403/113; 384/202; 277/628

[58] Field of Search .......................... 74/473.34; 403/114, 403/113, 122, 132, 135; 384/202, 203, 206, 208, 209, 210; 277/628, 634, 640, 652

[56] References Cited

U.S. PATENT DOCUMENTS

| | | | |
|---|---|---|---|
| 3,707,094 | 12/1972 | Herbenar et al. | 74/473.34 |
| 3,707,852 | 1/1973 | Burckhardt et al. | 277/205 X |
| 4,537,524 | 8/1985 | Hanson | 403/135 X |
| 5,364,191 | 11/1994 | Gruber | 384/203 |
| 5,855,448 | 1/1999 | Showalter et al. | 403/122 X |

*Primary Examiner*—David A. Bucci
*Assistant Examiner*—Colby Hansen
*Attorney, Agent, or Firm*—Bierman, Muserlian and Lucas

[57] ABSTRACT

A gearshift lever (3) is mounted on a ball-and-socket joint which is partially surrounded by a bearing shell (8) made of plastic whereby an economic mounting arrangement (2) which permits maintenance work and can prevent a transmission of vibrations to the gearshift lever (3) is achieved by the fact that the gearshift lever (3) is mounted through the bearing shell (8) on a ball (7) which is rigidly connected to an engine or gearbox casing (1), and the bearing shell (8) is connected to an outer ring (17) through damping rings (18, 19), the gearshift lever (3) being pivotally mounted on an outer peripheral surface of this outer ring through a hub (24).

7 Claims, 2 Drawing Sheets

MOUNTING ARRANGEMENT FOR AN EXTERNAL GEARSHIFT MECHANISM OF AN AUTOMOBILE TRANSMISSION

FIELD OF THE INVENTION

A mounting arrangement for a gearshift lever of an external gearshift mechanism of an automobile transmission comprising a ball-and-socket joint partially surrounded by a bearing shell made of plastic and having a concave inner peripheral surface.

BACKGROUND OF THE INVENTION

An external gearshift mechanism of the above type is commonly used in light and heavy utility vehicles. The gearshift lever is generally mounted on the floor of the driver's cab so that a transmission of vibrations to the gearshift lever can be largely avoided because, as a rule, the driver's cab is elastically mounted on the undercarriage of the vehicle.

This type of mounting of a gearshift lever on the cab floor is described in the species-defining German Patent No. 42 21 762 A1. Since, however, for maintenance or repair work on the internal combustion engine of the utility vehicle, the driver's cab has to be tilted about a pivot axis, it is necessary either to separate the transmission linkage of the external gearshift mechanism from the gearshift lever, or the linkage must be telescopable. However, a telescoping connection of the gearshift lever to the vehicle transmission is a complicated construction and involves additional costs.

OBJECTS OF THE INVENTION

It is an object of the invention to provide a mounting arrangement for a gearshift lever of an external gearshift mechanism which permits a tilting of the driver's cab without additional measures such as, for example, a telescoping gearshift linkage. However, care must be taken that although the mounting of the gearshift lever is vibration-damped, the direct feel for gearshifting with the gearshift lever is not lost.

This and other objects and advantages of the invention will become obvious from the following detailed description.

SUMMARY OF THE INVENTION

The mounting arrangement of the invention for a gearshift lever of an external gearshift mechanism of an automobile transmission comprising a ball-and-socket joint partially surrounded by a bearing shell made of plastic and having a concave inner peripheral surface, is characterized in that
the mounting arrangement comprises a ball-ended spindle which is rigidly connected to an engine or gearbox casing and comprises a ball on which the gearshift lever is guided through the bearing shell for pivoting in two directions of movement,
the bearing shell is surrounded by an outer ring with formation of a radial gap in which a damping means is arranged, and
the gearshift lever is pivotally guided through a hub on an outer peripheral surface of the outer ring.

Since, as a result, the gearshift lever is stationarily articulated on the engine or gearbox casing, it has only to be assured that, when tilted, the driver's cab can pivot relative to the gearshift lever by special measures implemented on the floor of the cab. The damping means arranged according to the invention between the bearing shell and the outer ring assures that vibrational excitation caused by vibrations of the engine or the drive train cannot be transmitted to the gearshift lever. Moreover, a structurally simple and very compact combination of a gearshift lever mounting and a damping is obtained.

In a further embodiment of the invention, the bearing shell comprises a circumferential groove which extends axially beyond the central transverse plane of the bearing shell, and a plurality of circumferentially spaced slits extend from the circumferential groove into the concave inner peripheral surface in the longitudinal direction of the ball-ended spindle to form tongues which extend beyond the equator of the ball. These elastic tongues which engage the ball permit a mounting of the bearing shell on the ball and at the same time, compensate any play occurring between these two components automatically.

It is further possible to insert an elastic ring into the circumferential groove to bias the tongues radially towards the ball. This elastic ring acts as a biasing means by pressing the tongues which are configured as segments against the surface of the ball without play. Since this elastic ring is inserted in the circumferential groove and therefore supported on the wall of the groove opposite the tongues, the elastic ring does not need to be pre-stressed radially by a length expansion.

As already mentioned, in an arrangement of the ball-ended spindle on the internal combustion engine, the gearbox or the frame of the vehicle, vibrations are transmitted to the ball-ended spindle which can result in a strong vibration of the gearshift lever. These vibrations are advantageously damped by the invention in that the damping means comprises two grooved rings arranged on either side of the central transverse plane of the bearing shell. Both the outer ring and the bearing shell must be appropriately profiled for receiving these grooved rings. However, care must be taken that the degree of radial mobility of the outer ring relative to the bearing shell is limited to a maximum value. This is achieved by arranging between the opposite end faces of the grooved rings an O-ring which permits the outer ring to have a radial mobility of ±0.5 mm relative to the bearing shell.

The mounting arrangement of the gearshift lever advantageously comprises further components which, on the one hand, reduce the amplitude of vibration in axial direction and, on the other hand, serve as limiters for an angle of tilt of the bearing shell and the outer ring which are vibrationally insulated from each other. For obtaining these effects, a protective cap is arranged on one end face of the outer ring with interposition of a rubber profile. This protective cap accomplishes the aforesaid effects and, in conjunction with the rubber profile also prevents a penetration of dirt particles into the mounting arrangement.

An angular ring is fixed on the opposite end face of the outer ring nearer the engine or gearbox casing with interposition of a rubber profile. One end of a folding bellows is vulcanized on the bent end of the angular ring, while a second end of the folding bellows engages into a groove of the ball-ended spindle by a bead. Together with the rubber profile, this angular ring likewise effects an axial damping of vibrations and a limitation of the angular mobility of the bearing shell and the outer ring. The folding bellows which is vulcanized on the outer ring and the diameter of whose folds may increase in the direction of its beaded end, likewise prevents the penetration of dirt particles into the mounting arrangement. Due to the special conical outer contour of the folding bellows, relatively large angles of tilt can be realized in a simple manner in the mounting arrangement without damage to the folding bellows. Pivoting movements result in a relative movement between the sealing bead and the groove in the ball-ended spindle.

According to a final feature of the invention, the angular ring surrounds the tongues in radially spaced relationship thereto. Thus, the angular ring forms a radial stop which prevents the bearing shell from disengaging from the ball under extreme axial loading.

A preferred embodiment of the invention will now be described with reference to the appended drawings.

DETAILED DESCRIPTION OF A PREFERRED EMBODIMENT OF THE INVENTION

Figure 1:
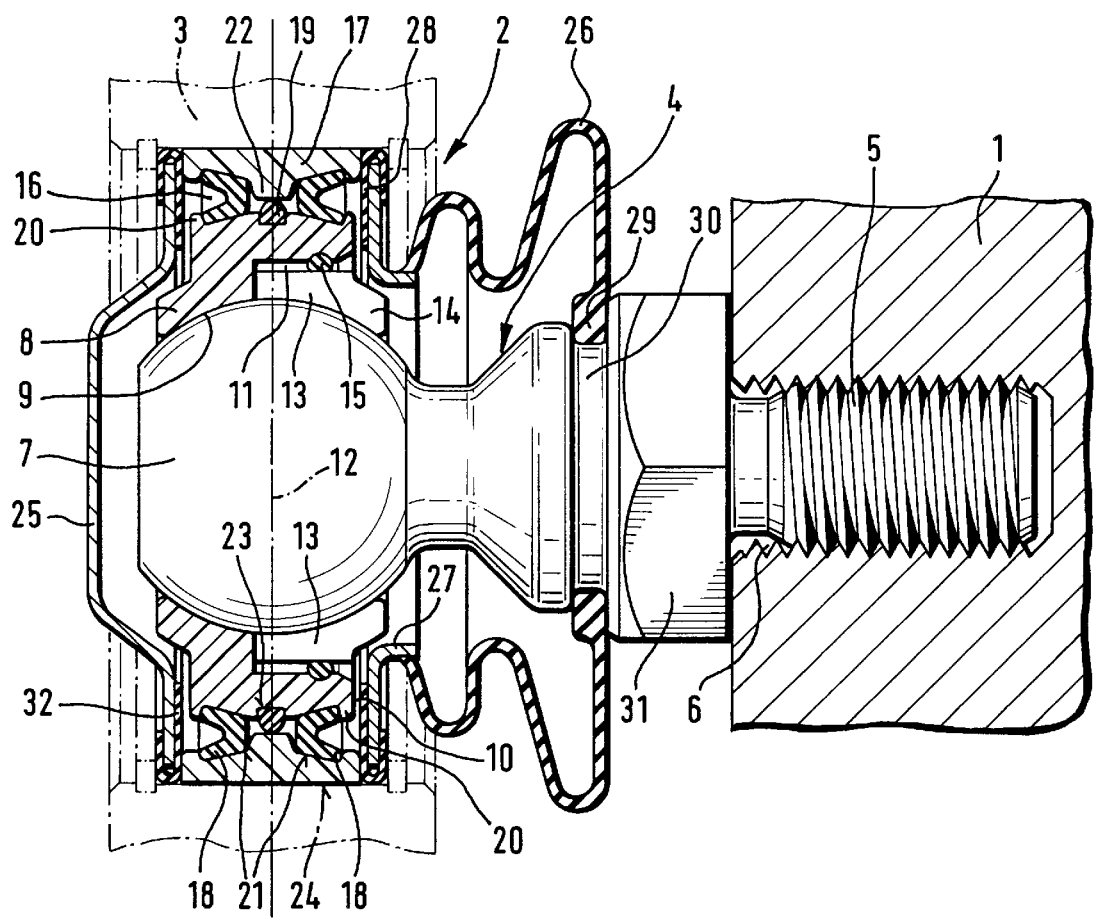
FIG. 1 is a longitudinal cross-section through a mounting arrangement of the invention for a gearshift lever.

In FIG. 1, the numeral 1 identifies a portion of a housing of an internal combustion engine or of a gearbox in which a mounting arrangement 2 for a gearshift lever 3 is fixed. The mounting arrangement comprises a ball-ended spindle 4 which is fixed by a threaded portion 5 in a threaded bore 6. The ball-ended spindle 4 comprises a ball 7 for receiving on a part of its periphery, a bearing shell 8. In the view shown in FIG. 1, the bearing shell 8 is pivotable and tiltable at least about the center of the ball 7, and executes these pivoting and tilting movements on the ball 7 through a sliding surface 9.

A circumferential groove 11 starts from an end face 10 of the bearing shell 8 nearer the housing 1 and extends beyond a common central transverse plane 12 of the ball 7 and the bearing shell 8. A plurality of slits 13 spaced uniformly over the periphery of the bearing shell 8 extend in radial direction from the circumferential groove 11 and interrupt the spherical sliding surface 9 so that elastic tongues 14 are formed. A radial extent of the circumferential groove 11 is dimensioned so that the bearing shell 8 can engage around the ball 7. Although the tongues 14 are elastic and can compensate an eventual play caused by wear, an additional elastic ring 15 configured as an O-ring is arranged in the circumferential groove 11. In the present example of embodiment, this elastic ring 15 can bias the tonges to the extent that a constant freedom from play is guaranteed in the mounting arrangement for wear of up to 0.4 mm. The elastic ring 15 is supported with its outer periphery against a continuous wall section of the circumferential groove 11. The bearing shell 8 is made of a plastic having favorable sliding properties and a high heat resistance. A suitable plastic for this purpose is ultramide T.

On its outer periphery, the bearing shell 8 is surrounded by an outer ring 17 with formation of a gap 16 in which a damping means comprising two grooved rings 18 and an O-ring 19 is arranged. The grooved rings 18 are fixed on the bearing shell 8 by flanges 20 of the bearing shell 8, while in the outer ring 17, they are fixed by grooves 21. The grooved rings 18 prevent a transmission of vibrations originating in the housing 1 to the gearshift lever 3. The outer ring 17 comprises a central, inwards pointing extension 22 which engages between the two grooved rings 18 and serves as a guide for the O-ring 19. The O-ring 19 is supported on the other side in a groove 23 of the bearing shell 8. This O-ring increases the radial rigidity so that a radial mobility of the outer ring 17 relative to the bearing shell 8 is limited to ±5 mm.

A hub 24 of the gearshift lever 3 is pivoted on the outer periphery of the outer ring 17. The mounting arrangement 2 of the gearshift lever 3 additionally comprises means which prevent both a penetration of dirt particles into the mounting arrangement 2 and a transmission of axial vibrations. An appropriate sealing of the mounting arrangement 2 is effected by a protective cap 25 which is arranged in the region of the end of the ball 7, and by a folding bellows 26 which seals the mounting arrangement 2 on an end face nearer the housing 1. The folding bellows 26 is fixed on the outer ring 17 by an angular ring 27 and a rubber profile 28 surrounding the angular ring 27 portionwise. The folding bellows 26 is vulcanized at one end on the angular ring 27 while engaging at a second end by a bead 29 into a groove 30 of the ball-ended spindle 4. This groove 30 is situated directly adjacent to a hexagon 31 of the ball-ended spindle 4.

Besides fixing the the folding bellows 26, the angular ring 27 serves, in conjunction with the rubber profile, to damp axial vibrations in the mounting arrangement 2. Vibrational damping at the opposite end is effected by a further rubber profile 32 arranged between the protective cap 25 and the outer ring 17. Moreover, the two rubber profiles 28 and 32 cooperate with the protective cap 25 and the angular ring 27 to act as an additional end damping means. The angular ring 27 which is bent at a radial distance to the tongues 14 has the additional function of securing the bearing shell 8 on the ball 7 because the angular ring 27 limits the radial mobility of the tongues 14 so that the bearing shell 8 cannot disengage from the ball 7.

Figure 2:
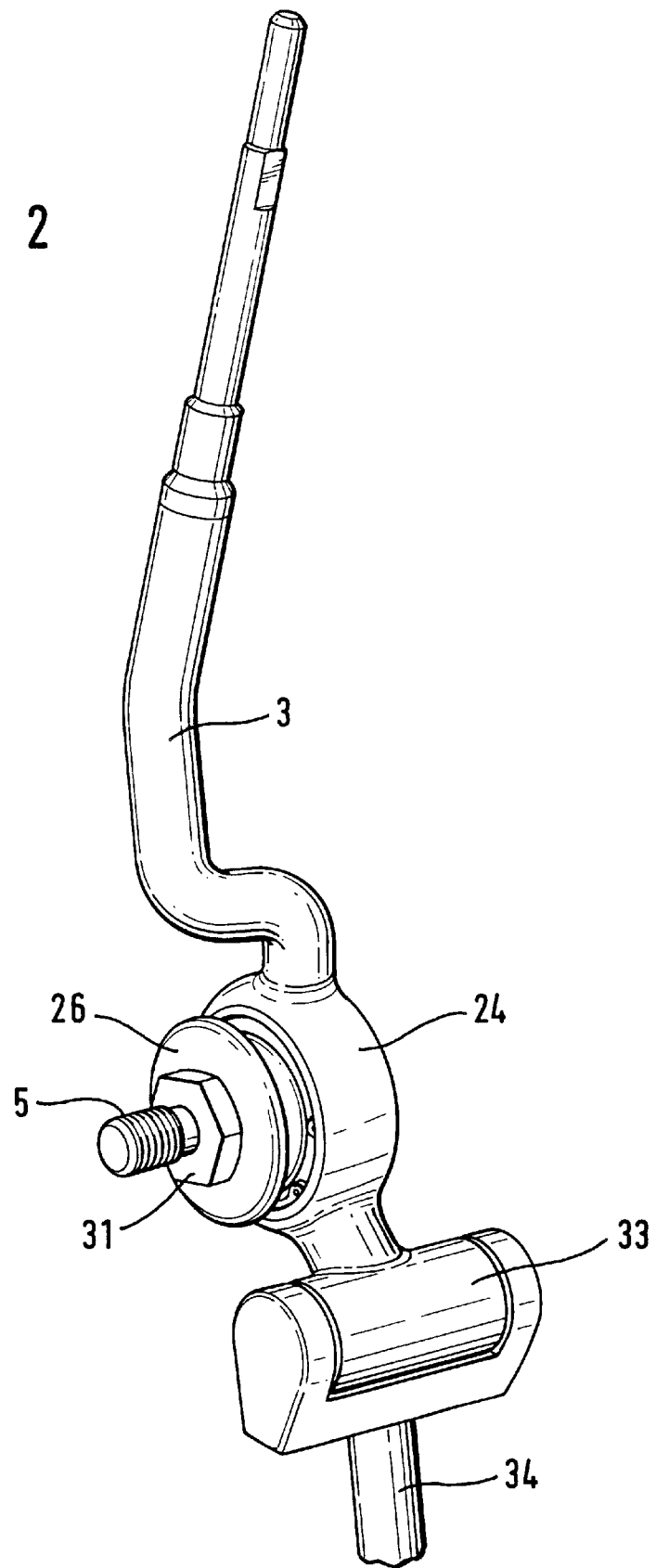
FIG. 2 is a perspective view of a gearshift lever disposed on the mounting arrangement of the invention.

FIG. 2 shows the general disposition of the gearshift lever 3 on the mounting arrangement 2. The end of the gearshift lever 3 extending beyond the hub 24 comprises an eye 33 in which a gearshift linkage 34 is suspended which, at its other end, is connected to a gearbox. The figure further shows the threaded section 5 of the ball-ended spindle 4 by which the mounting arrangement 2 can be fixed in a housing of an internal combustion engine or of a gearbox. The shift pattern would normally be of the H or double H type in which the gear shifting gates are preselected by moving the gearshift lever 3 in a plane extending lengthwise of the ball-ended spindle 4, and switching to individual gears is effected by a pivoting of the gearshift lever 3 on the outer ring 17.

Various modifications of the mounting arrangement of the invention may be made without departing from the spirit or scope thereof and it is to be understood that the invention is intended to be limited only as defined in the appended claims.

What I claim is:

1. A mounting arrangement (2) for a gearshift lever (3) of an external gearshift mechanism of an automobile transmission comprising a ball-and-socket joint partially surrounded by a bearing shell (8) made of plastic and having a concave inner peripheral surface, characterized in that the mounting arrangement (2) comprises a ball-ended spindle (4) which is rigidly connected to an engine or gearbox casing (1) and comprises a ball (7) on which the gearshift lever (3) is guided through the bearing shell (8) for pivoting in two directions of movement, the bearing shell (8) is surrounded by an outer ring (17) with formation of a radial gap (16) in which a damping means (18, 19) is arranged, and the gearshift lever (3) is pivotally guided through a hub (24) on an outer peripheral surface of the outer ring (17) the bearing shell (8) comprises a circumferential groove (11) which extends beyond a central transverse plane (12) of the bearing shell (8), and a plurality of circumferentially spaced slits (13) extend from the circumferential groove (11) into the concave inner peripheral surface in a longitudinal direction of the ball-ended spindle (4) to form tongues (14) which extend beyond an equator of the ball (7).

2. A mounting arrangement (2) of claim 1 wherein an elastic ring (15) is inserted into the circumferential groove (11) which biases the tongues (14) radially towards the ball (7).

3. A mounting arrangement (2) of claim 1 wherein the damping means comprises two grooved rings (18) arranged on either side of the central transverse plane of the bearing shell (8).

4. A mounting arrangement (2) of claim 3 wherein an O-ring (19) which permits the outer ring (17) a radial mobility of ±0.5 mm relative to the bearing shell (8) is arranged between opposite end faces of the grooved rings (18).

5. A mounting arrangement (2) of claim 1 wherein a protective cap (25) is arranged on one end face of the outer ring (17) with interposition of a rubber profile (32).

6. A mounting arrangement (2) of claim 1 wherein an angular ring (27) is fixed on an end face of the outer ring (17) nearer the engine or gearbox casing (1) with interposition of a rubber profile (28), and one end of a folding bellows (26) is vulcanized on a bent end of the angular ring (27), while a second end of the folding bellows (26) engages into a groove. (30) of the ball-ended spindle (4) by a bead (29).

7. A mounting arrangement (2) of claim 6 wherein the angular ring (27) surrounds tongues (14) in radially spaced relationship thereto.

* * * * *